United States Patent Office 3,432,209
Patented Mar. 11, 1969

3,432,209
TRANSPORT OF SOLIDS WITH PETROLEUM IN PIPELINES
Paul R. Scott, Houston, Tex., assignor to Shell Oil Company, New York, N.Y., a corporation of Delaware
No Drawing. Filed Nov. 4, 1965, Ser. No. 506,408
U.S. Cl. 302—66
Int. Cl. B65g 53/30
3 Claims

ABSTRACT OF THE DISCLOSURE

A method of pipeline transporting of slurries of inorganic salts in petroleum without settling-out the salts while in transit by addition to the slurry of a small amount of an anionic sulfonate dispersant and subsequent recovery at the terminal end of the inorganic salts and petroleum into its essentially pure components.

---

This invention relates to a method of simultaneously transporting liquids and solids via pipelines and more particularly, to a method of flowing inorganic salts suspended in petroleum through pipelines without appreciable settling-out of the inorganic salt during transit.

Vast networks of pipelines, particularly in southwestern United States, provide transport means for moving petroleum from producing areas to other areas having good transportation facilities or refining facilities. In many cases, the producing areas are isolated areas and have large deposits of mineral salts which are valuable if they can be economically moved to areas having suitable transportation facilities.

Because of the availability of petroleum pipelines adjacent to areas having substantial deposits of mineral salts, but lacking other adequate transportation facilities, considerable effort has been directed to find a method by which the mineral salts could be transported in the available petroleum pipelines. For example, U.S. 2,610,900, a patent issued to Cross, September 16, 1952, discloses a method of simultaneously pumping petroleum and water brines of soluble mineral salts having undissolved granules therein through pipelines by controlling the viscosity of the mixture and size of the granules of the mineral salt.

However, in the transportation of solids by suspending them in petroleum flowing through pipelines, a considerable number of problems must be dealt with. If the granules of the solid material are too small, the suspension stabilizes and separation of the suspension becomes difficult; and if the granules are too highly dispersed, the economics of collecting them at the destination becomes unacceptable. The addition of other materials in order to form more stable suspensions also must be dealt wtih at the destination and can often result in contamination of either the petroleum or suspended salt. However, none of the above problems are as acute as the problem first encountered; that of keeping the granules or solids from settling-out petroleum during the time the suspension is traversing the pipeline since this causes plugs, blocks, pump fouling and other similar difficulties.

As is generally the case, the granules or solid particles, particularly those of mineral salts, have a greater density than the liquid petroleum and will tend to settle as the petroleum having such solids in suspension traverses a pipeline. Baffles can be used in the pipeline to develop turbulent flow and/or continuous mixing so that the suspension will not settle-out of the petroleum, but this causes pumping costs to rise sharply and substantially. Further, extreme difficulties develop if the pipelines are shut-down for any reason under these conditions since the granules will settle in the pipeline and it is difficult to avoid blockage of the pipeline. In addition, the frictional losses caused by the baffles can push the pumping cost well above the value of the solids attempted to be transported in this manner even if blockage because of shut-downs does not occur.

In order that the influence of the settling properties of solids, particularly granular type which closely approximate a sphere (such as granules of most mineral salts), can be better understood, the factors affecting the settling velocity should be considered. The velocity at which the particles or granules settle can be roughly represented by a formal equation and since the petroleum and the solids move to the pipeline in unison, it is possible to consider the settling velocities of the granules in a stagnant liquid as a very rough approximation of those occurring during pipeline transport of suspensions. Thus, the following equation adequately represents the settling velocities which should be considered when working with petroleum solid suspensions.

$$V = \frac{gD^2(\rho_s - \rho_l)}{18\mu}$$

wherein:
$V$ = settling velocity
$g$ = gravitational force
$D$ = diameter of the particle or granule
$\rho_s$ = the density of the solid granule
$\rho_l$ = the density of the liquid
$\mu$ = the viscosity of the liquid From the above equation it is apparent that as the diameter of the granule increases, the settling velocity of the granule increases proportional to the square of the diameter. Thus, one way to lessen the settling velocity of granules is to decrease the diameter of the individual particles in suspension. However, while the technique is possible to a point it is not always desirable since the particles may be too fine for commercial use and may have to be reconstituted to large size particles after transport is completed; also separation of the solids from the petroleum becomes extremely difficult. Alternatively, it can be appreciated from the equation that the viscosity of the liquid can be increased to decrease the settling velocity but this has the drawback of manifestly increasing pumping costs and possibly contaminating the petroleum, both of which are undesirable. Nothing in the above equation accounts for turbulent mixing but this has already been dismissed as being economically unsound because of the increased pumping costs and will not be further considered.

It has now been found that many of the above problems can be overcome when transporting mineral salts suspended in petroleum via pipelines by the addition of certain alkali and/or alkaline earth salts of organic sulfonates to their suspensions which will stabilize the suspension. Apparently, these special stabilizers which have a rather large bulky organic group which is sulfonated, attach to the surfaces of the mineral salt granules increasing the effective diameter. This would normally tend to increase the settling velocity of the composite but for the fact that the net density of the composite is manifestly lowered, even to the point that the net density of the granule and stabilizer composite begins to approach that of the liquid petroleum. Obviously, in the above equation when $\rho_s = \rho_l$ the settling velocity of the particles become zero and the suspension will be permanently stabilized until such an established equilibrium is disturbed. Further, the large hydrocarbon portions of the stabilizer molecules probably contribute to stabilizing the system since its hydrocarbon portions are soluble in the petroleum. Also, some wetting of the solid particles by the stabilizer is probable.

Using these unique suspension stabilizers, it is possible to transport granular mineral salts suspended in petroleum flowing through pipelines without appreciable settling of the salt. It should be appreciated that the size of the mineral salt granules must be within certain parameters in order for the mechanism of this invention to be operative. Such size limitations of the granules will be alluded to later in disclosure.

The organic suspension stabilizers are broadly alkali and/or alkaline earth metal salts of organic sulfonates. While these are in the general classification of surfactants, it is noted that other surfactants, such as the surface-active "builders" often used in detergents, and particularly those of polyamine condensates and alkyl phosphonates, promote settling and aggregation rather than hinder settling, as is the object of this invention. Thus, the mechanism by which the suspension stabilizers of this invention achieve a stabilized suspension cannot be attributed broadly to the mechanism of surface-active agents, like detergents.

More particularly, alkali and/or alkaline earth salts of alkyl naphthalene sulfonates are the most preferred. These salts have the general formula:

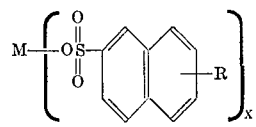

wherein M is the alkali or alkaline earth metal, R is an alkyl group having 4 to 6 carbon atoms, and X is the valency of M.

Polymerized alkali and/or alkaline earth salts of alkyl aryl sulfonates are also effective in the practice of the present invention. Also, the same salts of lignosulfonates find application in the instant invention; however, the surface-active polyamine condensates and alkyl phosphonates should be strictly avoided.

Quite generally, the stabilizers of this invention are metal salts of sulfonated mono- or polyaromatic nuclei having alkyl substituents. The organic portion of the stabilizer should contain from 8 to 20 carbon atoms to achieve effective stabilization.

As mentioned earlier, the mineral salt granules must be within certain size parameters in order that the desired stabilization effect can be achieved with the stabilizers of this invention. Mineral salts containing significant portions of granules having diameters up to 4,000 microns can be stabilized in petroleum suspensions according to this invention. Smaller size granules, of course, will be more easily stabilized than the large ones. Granules with diameters over 5,000 microns can be only partially stabilized. A useful range for the employment of the invention is with granules having diameters from 10 to 1,000 microns.

Many mineral salts (including ores) can be stabilized in petroleum by the practice of the instant invention. In particular, the alkali and/or alkaline earth metal salts of chlorides, sulfates, carbonates and phosphates can be prepared as stabilized suspensions in petroleum for pipeline transport according to this invention. Certain oxides of minerals (ores) of Group VIII of the Periodic Table can also be suspended in petroleum according to this invention, such as iron ore. Mineral salts especially adaptable in the practice of the invention are the chlorides of sodium and potassium.

The amount of stabilizer necessary for the practice of this invention will vary relative to the granule size, but one of the important features of this invention is that very small quantities of the stabilizer will be required. Generally, it will vary from 0.01 to 0.05% based on the weight of the mineral salt and this amount is adequate to stabilize granules in petroleum. Further, it was determined that up to 150 parts by weight of mineral salt granules to 100 parts by weight of petroleum having a Saybolt universal viscosity of 3,000 seconds at 70° F. could be pumped through pipelines without acute settling problems when these novel stabilizers were used.

Once the suspension of mineral salt in petroleum reaches the intended destination via pipelines, the suspension is treated to effect the separation of salt granules from the petroleum. This can be accomplished in many ways such as by filtering or subjecting the mixture to other physical or chemical separations, such as hydrocyclones. When the mineral salt granules are water soluble, they can be separated by "brining" which is contacting the suspension with an aqueous brine which extracts the water soluble granules from the petroleum in the aqueous brine. When water soluble salts are being extracted in this manner, the stabilizer will also be extracted by the aqueous brine and can be recovered subsequently from the mineral salt and aqueous brine by such techniques as acidification and thereafter converted back to the alkali and/or alkaline earth metal salts for reuse.

A non-limiting example illustrating the present invention is set forth below.

EXAMPLE I

To 100 parts of liquid petroleum having a viscosity of 5.5 centipoises at 25° C., 150 parts of potassium chloride granules having an average diameter of 300 microns were added. To this mixture 0.014 part of a calcium salt of a high molecular weight hydrocarbon sulfonate (TLF 1616) was added and the mixture agitated to ensure good mixing.

The agitated suspension was then placed in a transparent container and the settling rate monitored. It was noted that only 6% of the suspending petroleum was free of potassium chloride after a settling period of two hours.

Had the suspension been moving through a pipeline, eddy mixing which would occur may prevent any settling of the salt granules at all as the suspension passes through a pipeline.

In order that the invention may be more fully appreciated, the effectiveness of various materials as stabilizers with a potash-oil slurry was determined by adding the materials to a 35% by volume potash slurry and mixing vigorously in a 250 ml. mixing cylinder at ambient temperature (75°±2° F.). The cylinder was then positioned vertically and the sediment level checked at intervals. The sediment level in percent is the volume of slurry below the generally solids free top layer forming as solids settle out of the slurry expressed in percent of the total height of the sediment level at time zero in the mixing cylinder. Thus, the higher the percentage, the more effective the stabilizer. The oil used for the slurry was a crude having a viscosity of 5.5 centipoises and a specific gravity of 0.835 at ambient temperature (75° F.).

The same size distribution of potash granules was used in each of the cylinders and the bulk of the granules or particles in each cylinder was in the 150 micron range with some particles plus 1200 microns and some minus 44 microns.

Each slurry mixture in the cylinders was agitated by shaking 120 cycles per minute for one minute and positioned vertically. Time zero is when the cylinders are positioned vertically. The results of the tests appear in the tables below.

TABLE 1.—EFFECT OF VARIOUS STABILIZERS ON SETTLING CHARACTERISTICS OF POTASH-OIL SLURRIES

Test Conditions: Settling test conducted in 250 ml. mixing cylinder at ambient temperature (75±2° F.) oil had Sp. Gr.=0.835, viscosity=5.5 cp.

| Blend No. | Potash, percent v. | Settling time, hrs. | Additive, p.p.m. | Sediment level, percent of original level at time=0 | | | | |
|---|---|---|---|---|---|---|---|---|
| | | | | Calcium ANS [1] | Darvan No. 2 [2] | Marasperse O [3] | Nekal NF [4] | No additive |
| 1 | 35 | ½ | 5 | 90 | (⁵) | (⁵) | (⁵) | 70 |
| 2 | 35 | ½ | 10 | 90 | 83 | 83 | 80 | 70 |
| 3 | 35 | ½ | 20 | 89 | 89 | 89 | 85 | 70 |
| 4 | 35 | ½ | 30 | — | 88 | 88 | 90 | 65 |
| 5 | 35 | 16 | 30 | 86 | 87 | 87 | — | 70 |
| 6 | 35 | ½ | 10 | 96 | 85 | 85 | — | 79 |
| 7 | 35 | ½ | 20 | 96 | 92 | 92 | 85 | 79 |

[1] Calcium Alkyl Naphthalene Sulfonate.
[2] Sodium Alkylaryl Sulfonate.
[3] Calcium Lignosulfonate.
[4] Sodium Alkyl Naphthalene Sulfonate.
[5] Not effective.
NOTE.—All surfactants are anionic.

TABLE 2.—EVALUATION OF DISPERSANTS. EFFECT OF VARIOUS SURFACTANTS ON SETTLING CHARACTERISTICS OF POTASH-OIL SLURRIES

| Blend No. | Potash, percent v. | Settling time, hrs. | Additive, p.p.m. | Sediment level, percent of original | | | |
|---|---|---|---|---|---|---|---|
| | | | | Nopcogen 16-0 [1] | MTP [2] | TLF 1133 [3] | TLF 1826 [3] |
| 1 | 35 | 2 | 0 | 71 | 71 | | |
| 2 | 35 | 2 | 10 | 70 | 70 | | |
| 3 | 35 | 2 | 30 | | 66 | | |
| 4 | 35 | 2 | 50 | 66 | 64 | | |
| 5 | 40 | 2 | 0 | | | 77 | 77 |
| 6 | 40 | 2 | 20 | | | 74 | 76 |
| 7 | 40 | 2 | 60 | | | 73 | 76 |
| 8 | 40 | 2 | 100 | | | 73 | 75 |
| 9 | 55 | 2 | 0 | 94 | 94 | | |
| 10 | 55 | 2 | 10 | 95 | 94 | | |
| 11 | 55 | 2 | 30 | 95 | 94 | | |
| 12 | 55 | 2 | 50 | 92 | 92 | | |
| 13 | 55 | 2 | 100 | 86 | 88 | | |

[1] Oleic polyamine condensate (cationic).
[2] Monobutyl 2-thiododecyl phosphonate.
*Same oil and temperatures as used in Table 1.

TABLE 3.—EFFECT OF Du PONT ADDITIVE TLF 1616 [1] ON SETTLING CHARACTERISTICS OF 40% v. POTASH-OIL SLURRIES*

| Time in min. | Sediment level, percent of original level | | | | |
|---|---|---|---|---|---|
| | 0 p.p.m. | 40 p.p.m. | 60 p.p.m. | 80 p.p.m. | 140 p.p.m. |
| 0 | 100 | 100 | 100 | 100 | 100 |
| 0.5 | 99 | 100 | 100 | 100 | 100 |
| 1 | 99 | 99 | 99 | 99 | 99 |
| 2 | 99 | 99 | 99 | 99 | 99 |
| 5 | 98 | 98 | 98 | 98 | 98 |
| 10 | 96 | 96 | 96 | 96 | 96 |
| 20 | 93 | 93 | 93 | 95 | 95 |
| 30 | 90 | 90 | 90 | 93 | 94 |
| 60 | 85 | 87 | 88 | 93 | 94 |
| 20 | 85 | 87 | 88 | 93 | 94 |
| 960 | 85 | | | | 93 |

[1] Calcium hydrocarbon sulfonate (anionic).
*Same oil and temperatures as used in Table 1.

The above data was obtained with potash-oil slurries which are substantially water free. Since water wets the surfaces of potash particles, they flocculate and settle rapidly when greater than 2% by volume of water is present in the slurry.

I claim as my invention:

1. In a process of pipeline transportation of a slurry of inorganic salt granules and petroleum liquids wherein the inorganic salt granules have diameters in the range of from about 10 to about 5000 microns and under flow conditions in a pipeline tend to settle out, the improvement comprising inhibiting such settling and maintaining a stable slurry by addition to the slurry of an anionic stabilizer selected from the group consisting of alkali metal and alkaline earth metal organic sulfonates, in an amount sufficient to effect the net density of the salt-sulfonate composite to approach that of the density of the liquid petroleum.

2. In the process of pipeline transportation of a potash-petroleum oil slurry wherein the potash is in granules having diameters of 10–4000 microns and having a tendency to settle out, the improvement comprising inhibiting such settling and stabilizing the slurry by addition to the slurry of a sulfonate salt selected from the group consisting of alkali metal and alkaline earth metal alkyl naphthalene sulfonates, in an amount of from 0.01 to 0.05% based on the amount of potash present in the oil slurry.

3. A process according to claim 1 wherein the mineral salt is separated from the stabilized slurry at the terminal end of the pipeline by brining.

References Cited

UNITED STATES PATENTS

| 1,390,230 | 9/1921 | Bates | 302—14 |
| 2,128,913 | 9/1938 | Burk | 302—14 |
| 2,610,900 | 9/1952 | Cross | 302—66 |
| 3,206,256 | 9/1965 | Scott | 302—66 |

FOREIGN PATENTS 944,738   12/1963   Great Britain.

DANIEL E. WYMAN, *Primary Examiner.*
W. J. SHINE, *Assistant Examiner.*

U.S. Cl. X.R.
44—51; 302—14